July 2, 1968 ÁDÁM JUHÁSZ 3,390,772
MECHANIZED HEAVY DUTY FILTER PRESSES
Filed June 14, 1965 5 Sheets-Sheet 5

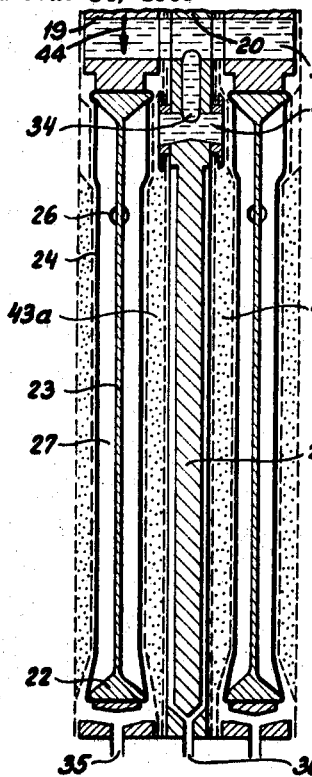
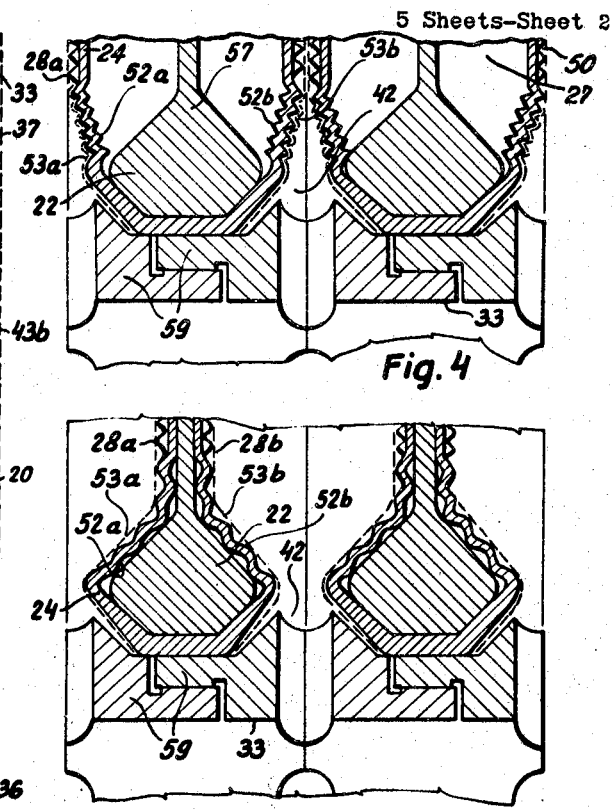
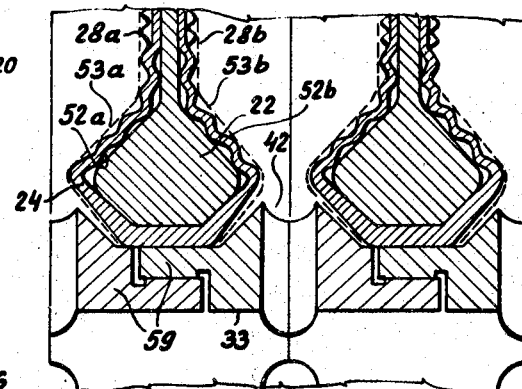
Fig. 3
Fig. 4
Fig. 5
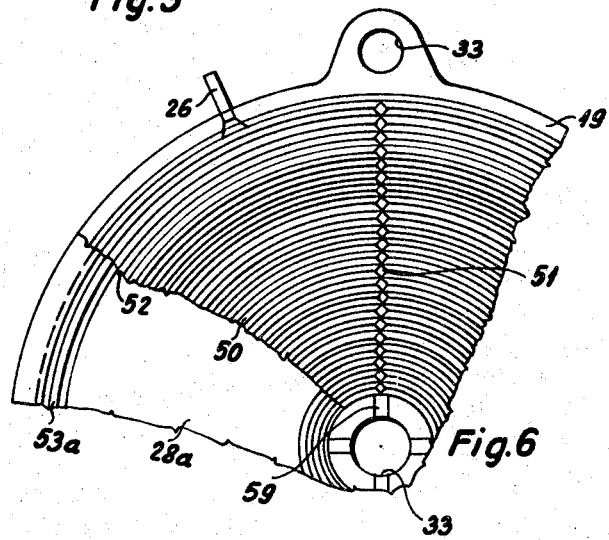
Fig. 6

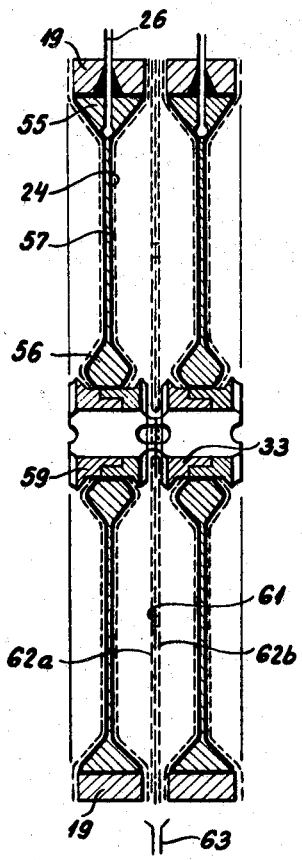
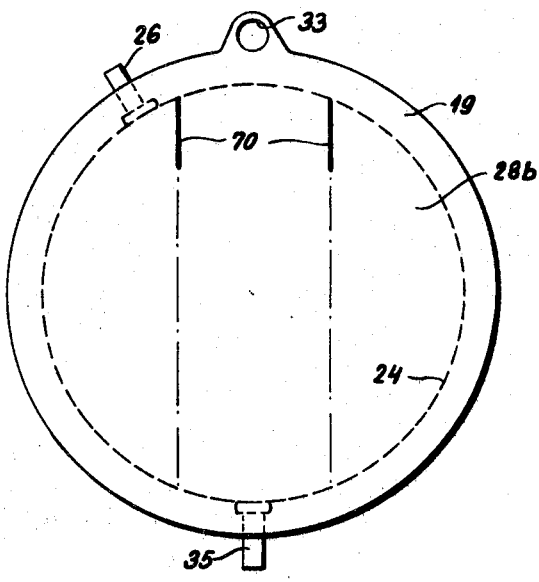
Fig. 9
Fig. 11

United States Patent Office 3,390,772
Patented July 2, 1968

3,390,772
MECHANIZED HEAVY DUTY FILTER PRESSES
Ádám Juhász, Almasfuzito, Hungary, assignor to Chemo-komplex Vegyipari Gep-es Berendezes Export-Import Vallalat, Budapest, Hungary
Filed June 14, 1965, Ser. No. 463,749
Claims priority, application Hungary, June 19, 1964, JU-156
9 Claims. (Cl. 210—66)

ABSTRACT OF THE DISCLOSURE

A mechanized heavy-duty filter press has a plurality of movable filter members. At least some of the filter members have inflatable bladders thereon, with filter means secured on opposite sides of the bladders and means for withdrawing a liquid from between the filter means and the bladder. The filtering area can thus be doubled, as compared to prior constructions in which the bladder itself formed one side of the filter chamber.

---

This invention relates to mechanized heavy duty filter presses.

As is known, conventional filter presses are of two different types. So-called frame and plate type filter presses consist of an optional number of filter frames and filter plates which are disposed alternately one beside the other. The filter frames—in accordance with the meaning of the term—surround an empty field or space whereas the filter plates are solid bodies both sides of which are covered with filter means, e.g. filter cloths. Passages in the filter plates serve for abducting a filtrate which has passed the filter means. On the other hand, residues in the form of filter cakes collect in chambers surrounded each by a filter frame and by a pair of filter means on adjacent filter plates.

Another type encompasses what is called box filter presses. These, in principle, consist likewise of an optional number of filter members which, however, are, as a rule, filter plates of similar construction with no filter frames therebetween. Box filter presses and their filter plates differ from the filter plates of plate and frame type filter presses by the concavity of their sides which, otherwise, are likewise covered with filter means. Here, filter cakes grow in cake chambers between adjacent filter means of a pair of contiguous filter plates. The filtrate withdraws substantially through similar channels or passages as in plate and frame type filter presses.

Filter frames and/or filter plates as filter members of a filter press are compressed by a pair of closing means or heads arranged at both extremities of the filter press.

An obstacle of employing the known filter presses for heavy duty automatic work is that the filter cakes have to be removed manually by scraping them out of the filter members. A further difficulty consists in that relatively dry filter cakes can be obtained only if they completely fill the cake chambers. Until then only a more or less thin slurry will be present in the cake chambers and its liquid phase (i.e. the filtrate) withdraws at a very low rate since the growing cakes form a high hydraulic resistance against the flow of a liquid. It is due to this that in the course of what is called a filtering cycle, that is the time period from filter cake removal until filter cake removal the performance of both the plate and frame type and the box type filter presses is very poor and deteriorates exponentially. Consequently, the specific filtering output of known filter presses is relatively low. Furthermore the volume of the filter cakes being, as a rule, not adjustable, in most cases filtering cannot be carried out in cycles which would yield optimum efficiency. Instead, shorter or longer periods have to be employed, according to the time required for the cake chambers being completely filled up by cakes.

In order to obviate the aforesaid inconveniences, filter plate and frame type filter presses have been suggested, the filter frames of which comprise inflatable bladders with bracing inserts, the filter cakes growing in chambers delimited by a pair of filter plates provided with filter means, and by a filter frame therebetween. Actually the inflatable bladders subdivide the cake chambers of such filter presses in a pair of what might be called subchambers with an intermediate elastic-chamber. This means a considerable progress as regards automation since by connecting the elastic chambers with an external source of a pressure agent the filter cakes can automatically be compressed in the cake chambers and removed from the filter frames, respectively. However, only one side of the cake chambers being confined by filter means and their other sides being delimited by an adjacent wall of the inflatable bladders, the efficiency of the known arrangement which, otherwise, proved to be quite serviceable as regards automation, is not wholly satisfactory for the purposes of heavy duty work.

The main object of the present invention is to eliminate the aforesaid inconveniency and to rapidly increase the efficiency of filter presses with braced inflatable bladders. The basic idea of the invention is that the efficiency of such filter presses could practically be redoubled if, in contradistinction to known filter presses with braced bladders, filtering could take place also at sides of the cake chambers which face their associated braced bladders. It has been found that such arrangement is possible if the surfaces of the inflatable bladders are likewise provided with filter means and a filtrate passing therethrough is permitted to withdraw along passages between filter means and braced bladders. In accordance therewith, the invention relates to mechanized heavy duty filter presses of the type having inflatable bladders arranged each in a filter frame and braced by a solid bracer, the walls of said bladders being normally spaced apart by said bracers and the bladders themselves being arranged for connection to an adjustable external source of a pressure agent. The invention consists, in broader terms, in that the outer surfaces of said bladder walls are covered with filter means unified therewith, passages for abducting a filtrate being provided between said filter means and said bladder walls. Thus, the useful filtering surface and, therewith, the efficiency of the filter press increases to the double value of the efficiency of known filter presses of similar design and size, while the weight per unit filtering surface decreases to about the half of the former value. At the same time, the bladders are, due to their normally spaced apart walls and their connection to an external pressure source, suitable for both to compress filter cakes grown in cake chambers and, after spacing apart the filter members to throw them out from the filter press.

A further object of the present invention is to desiccate cakes obtained by filtering processes to a desired low value of humidity content. Hitherto, desiccating is performed in various apparatus and most frequently in desiccators heated by combustion gases, hot air, steam or electric energy. The thermal efficiency of such desiccators is, as a rule, very low. For evaporating e.g. 1 kilogram water they require 5 to 25 kilograms steam. By filter press according to the invention, partial or complete desiccation is rendered possible in the filter press proper. It is only necessary to introduce a pressure agent of elevated temperature, such as steam, warm air or hot water into the bladders simultaneously with compressing or thereafter, the amount of heat needed for desiccation being transmitted through the wall of the bladders to the cakes. In order to increase efficiency, heat transmission improving substances such as aluminum pigments may be added to the rubber material of the bladders when manufactured. The pressure of introduced steam, liquid or air causes the bladder walls to uniformly lie against the cake surfaces along which the cakes begin to desiccate by the heat of the pressure agent. Vapours withdrawing from the cakes may be abducted through the same passages which are provided for the withdrawal of the filtrate between the filter means and the bladder walls.

If there were no filter means between bladders and cakes, vapours could be abducted only with difficulties since they arise, above all, along the heated surfaces and, thus, would have to penetrate through already solid cakes. In contradistinction, in case of the present invention, where filter means and suitable channels are provided between bladders and cakes, vapours may withdraw like in case of heated wet porous materials. Thus, surface desiccation, evaporation of liquids sickering towards desiccated surfaces due to capillary action, flow of vapours yielded by amounts of liquids still present in cakes through now free pores towards dry cake surfaces, and their escape from such surfaces subsequently follow each other in a continuous sequence. Where steam is employed for heating, condensed water within the bladders may be withdrawn in a conventional manner through a steam trap or condensing vessel, or by means of the pressure of a slurry supplied in a next filtering cycle.

Where frame and plate type filter presses are employed, desiccation efficiency may still be enhanced by using hollow filter plates. Introducing a heating medium into such filter plates, cakes may be desiccated from both their sides. Uniform abutment is warranted by the pressure prevailing in the bladders and the vapour arising from the cake may withdraw on the filtrate paths.

An object of the present invention is to ensure common motions of bladder walls and filter means. As has been stated, bladder walls and filter means covering these walls form constructional units and perform their motions together, for which purpose they are connected with one another. Such connection can be obtained e.g. by glueing or curing. Common motion is enabled either by employing elastic filter means or surface area variations are rendered possible by shape. Obviously, when previously deformed (bulged in) inflatable bladders resume their original shapes either under the action of an inner overpressure or of their own elasticity, their walls become shorter. Conventional filter means such as filter cloths, however, are unable to follow such shortening because of their lack of expansibility. Therefore, bladder walls and filter means will preferably be provided with surface-increasing folds which means that unloaded bladders and filter means alike have corrugated shapes. Loading or expanding will then cause the folds of filter means and bladders to smooth out and thereby to permit a desired deformation of the former. Upon the filter members being spaced apart, the bladder walls and the filter means unified therewith resume their waved shape again whereby separation of cakes from filter means is enhanced as well.

The folds on the bladder walls form, at the same time, passages for abducting a filtrate. However, for this purpose special ribs or spacing layers lying against the bladder walls and perhaps fixed thereto such as coarsely woven fabrics, nets or glued-on cloths may be employed as well through the meshes of which a filtrate emerging from the filter means is enabled to withdraw.

A still further object of the present invention is to considerably decrease the weight and space requirement of filter presses of the plate and frame type. As is known, filter plates of known filter presses of the plate and frame type are relatively heavy and extensive filter members the destination of which is not only to support filter means and to comprise abduction channels for filtrates but also the assumption of asymmetric axial loads in the course of operation of the filter press. This is the reason why they are bulky. When an inlet for supplying a slurry to be filtered becomes obstructed or narrows down, the pressure difference prevailing between filter chamber communicating therewith and the filter chambers on its both sides may amount to several atmospheres dependent on the delivery pressure of the slurry. This means that in case of a filtering area of e.g. 1 square meter and a pressure difference of 5 absolute atmospheres such filter plate is exposed to the deforming action of a force of 50 tons. Obviously, only bulky filter plates are capable to withstand such forces without breakages or deformations. Therefore, both the specific weight (weight per unit filtering surface) and the price of known filter presses are relatively high.

In order to decrease the thickness of filter plates, it has already been suggested to abduct a filtrate by means of spacer screening cloths or iron braidings rather than by channels and to correspondingly attenuate the filter plates. It has also ben suggested to substitute elastic or compressible materials for filter plates made of metal. Such suggestions, however, were not successful in practice since both attenuated filter plates and compressible materials employed instead of metal were unsuitable for the assumption of high pressure differences occasionally prevailing at both sides of filter plates under the action of which the latter became prematurely deformed and destroyed. Moreover, filter plates made of compressible material failed for the further reason that conventional filter cloths are because of their lack of elasticity unsuitable to follow deformations of their associated filter plates.

If, on the other hand, a filter press according to the invention is employed and the solid bracers of the bladders have the form of frames the clearances of which are at least partly filled in by webs, filter plate may immediately be dispensed with since, in this case, bladders with such bracers are well capable to assume pressure differences which may prevail between adjacent cake chambers without any substantial deformation as has been proved by experiments. Thus, with such embodiment the bladdered filter frames of the filter press according to the invention may directly be juxtaposed without employment of filter plates since rigidity otherwise ensured by the latter is obtained now by the bracers of the bladders. Dispensing with the filter plates means obviously not only a substantial decrease of weight but also a considerably less space requirement. The useful volume of known filter presses, that is, their cake chamber volume amounts only to about 50 to 60 percentages of the total volume of the filter press, the remaining 40 to 50 percentages being occupied by filter plates. In contradistinction, with such new embodiment having braced bladders and no filter plates the useful volume reaches 85 to 95 percent of the total volume which means that space exploitation is practically redoubled as well or, what is the same, the space requirement decreases almost by 50 percent.

Another object of the present invention is to further decrease the specific weight of filter presses by composing the bracers for the bladders of an outer frame, of an inner frame and of a web connecting both frames in such a manner that the inner frames delimit each an opening which, in closed position of the filter press engage with axially abutted hollow cores and form a supply conduit for a slurry. Then, the bracer of the bladder is supported in its middle portion so that its web may considerably be thinner at similar unevenly distributed loads.

Compression of the cakes by means of admitting a pressure agent into the bladders as well as their removal from the cake chambers by means of the elasticity of the bladder walls is performed in a manner known per se as well hereinafter be described in closer details.

Still another object of the present invention is to further improve separation between cakes and their supports. As is known, there are slurries or suspensions the solid phases of which are liable to adhere to filter means while the filter cakes grow. The removal of such filter cakes particularly from filter plates may cause difficulties. In order to obviate such inconveniences, the filter members are provided with cake removing means such as elastic tongues which, in closed position of the filter press, lie against the filter means whereas in open position they enclose an acute angle with the planes of the filter members. Such tongues will be made of elastic metals, e.g. of spring steel bands or wires. For the purpose of cake removal it is sufficient to fix at least one such tongue at each side of the filter members. In closed filter presses these tongues lie against filter means of adjacent filter members. Thus, when cakes begin to grow, the tongues stay therebelow. Upon spacing apart the filter members, filter cakes grown above the tongues will automatically be pushed off from the filter means by the former. Such cake removing means may be employed with both plate and frame type and box type filter presses.

A further object of the present invention is to employ at least one elastic fibre disposed between adjacent filter plates and filter frames for cake removing means in frame and plate type filter presses, said fibres being anchored at the top on filter frames and at the bottom on filter plates, and occupying a vertical position in closed filter presses. Upon spacing apart the filter members removal of filter cakes is ensured by such fibres which move off the filter members and, thus, severs a filter cake which might have adhered to its support. Under the fibre, the cake may freely drop out of the filter press.

Further objects and details will be described by taking reference to the accompanying drawings which show several exemplified embodiments of the filter press according to the invention, and in which:

FIGS. 1 to 3 illustrate a detail of a plate and frame type filter press according to the invention in three different operational positions and in longitudinal sectional views.

FIGS. 4 and 5 illustrate a detail of another exemplified embodiment in two different operational positions.

FIG. 6 is a side elevational view to FIG. 4.

FIG. 9 is a sectional view of still another exemplified embodiment illustrated in a way similar to FIGS. 1 to 3. Finally:

FIGS. 10 and 11 show a longitudinal sectional view and a side elevational view taken along the line XI—XI of FIG. 10, respectively, of a detail of a still further exemplified embodiment.

Same reference characters refer to similar details throughout the various illustrated embodiments.

Figures 1, 2:
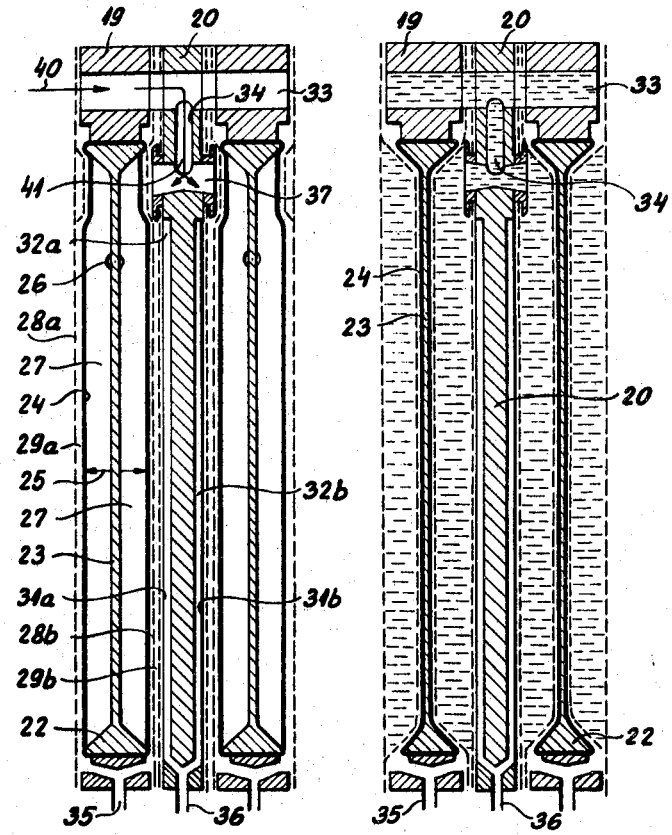
Figure 1A:
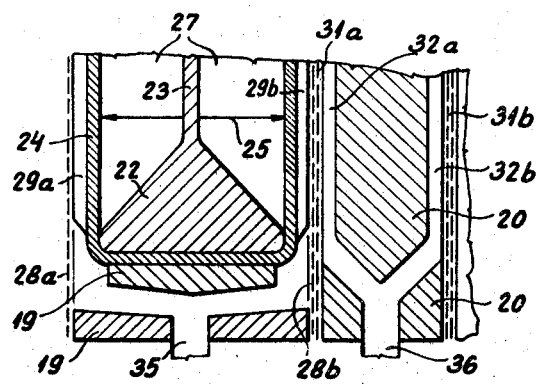
FIG. 1a shows a detail of FIG. 1 on an enlarged scale.

In the drawings, FIGS. 1 to 3 represent an exemplified embodiment of a filter press according to the invention which consists of alternately juxtaposed filter frames 19 and filter plates 20. In the instant case, filter frame 19 comprises a solid insert or bracer made e.g. of metal and consisting of a frame 22 and a web 23 wholly or partly occupying the clear opening of the former, said bracer 22, 23 being surrounded by a bladder 24 made of elastic material such as rubber and forming an elastic chamber 27. Both walls of bladder 24 are normally spaced apart and distanced from one another by an interstice 25 as shown in FIGS. 1 and 1a which represent an inoperational position of the filter press. The bladder 24 may, through an opening or passage 26 represented in the upper portion of FIG. 1, be connected to a pressure source not shown the pressure of which may reach the elastic chamber 27 e.g. through a not represented adjusting valve.

The outer wall surfaces of bladder 24 are covered with filter means unified therewith and consisting, in the instant case, of filter cloths 28a and 28b which lie against ribs 29a and 29b, respectively, forming parts of the bladder walls and permitting a filtrate having passed filter cloths 28a and 28b to flow down along the walls of bladder 24 (see FIG. 1a).

Both sides of filter plate 20 are likewise covered with filter cloths 31a and 31b which lie against ribs 32a and 32b of filter plate 20 and delimit filtrate abducting passages with the actual body of filter plate 20.

A slurry or suspension to be filtered is introduced from a main conduit 33 in the upper portion of contiguous filter frames 19 and filter plates 20 through inlet passages 34 and a chamber 37 into cake chambers between adjacent filter cloths such as 28b and 31a. Liquid portions of the suspension or slurry having penetrated filter cloths 28a and 28b withdraw in the form of a filtrate through a channel 35 in filter frame 19 whereas portions having filtered through filter cloths 31a and 31b are abducted through filtrate abducting channel or passage 36 in filter plate 20.

On its other side, filter plate 20 has a further filter frame juxtaposed to it which is followed again by a filter plate of the design of filter plate 20, etc., not shown. The filter press consists of an optional number of such filter members, closing means being provided at both its ends in a manner known per se and, therefore, not represented in the drawings. In operational position of the filter press, the filter members are axially compressed by said closing means. Then, e.g. filter cloths 28b and 31a lie practically against one another until they are separated by solid portions of a slurry or suspension introduced into cake chamber 42 (FIGS. 1 and 1a). In spaced apart position of the filter members gaps between filter frames 19 and filter plates 20 permit filter cakes grown therebetween to drop down and be removed.

In operation, the filter members of the filter press are compressed by said not represented closing means whereafter a suspension or slurry to be filtered is introduced through main channel 33 in direction of arrow 40 and flows through passages 34 in directions of double arrow 41 into chambers 37 and herefrom into cake chambers such as cake chamber 42 between filter cloth 28b of filter frame 19 and filter cloth 31a of filter plate 20 (FIG. 1a). It flows in a similar manner into a cake chamber between filter cloth 31b of filter plate 20 and the hither filter cloth of a further not represented filter plate, as well as between filter cloth 28a and the filter cloth of a further adjacent filter plate not shown.

This situation is illustrated in FIG. 2. The elastic bladders 24 become bulged in under the pressure of the suspension or slurry and the bladder walls lie against webs 23 of bracers 22, 23, and interstices 25 have practically disappeared.

Dependent on the pressure of the suspension or slurry delivery pump, filter cloths 28a, 28b, 31a, 31b, etc., will sooner or later be passed by a liquid which withdraws as a filtrate through said filtrate abducting passages 35 and 36.

Upon chambers 27 being put under pressure through openings 26 and the volume of bladders 24 increasing again, solid portions of the suspension or slurry remaining in cake chambers 42 in the form of cakes 43a and 43b become compressed. This is illustrated in FIG. 3. Chambers 37 become closed by the walls of bladders 24 from both sides.

Then, pressure compressing the filter members is relieved by loosening the closing means in a manner known per se whereafter the filter members are spaced apart. Now, cakes 43a and 43b grown in cake chambers such as cake chamber 42 drop down through gaps between adjacent filter frames 19 and filter plates 20. Should the cakes adhere to their filter frames, they will be thrown out therefrom by means of putting the chambers 27 under pressure and, thus, by increasing the volume thereof.

FIGS. 4 to 6 show an exemplified embodiment with which the filtrate abducting passages between bladder walls and filter means are formed in a manner shown in FIG. 6 by concentric grooves 50 rather than by substantially vertical ribs, said concentric grooves 50 being crossed by radial grooves 51. Thus, a filtrate flowing along concentric grooves 50 withdraws through radial grooves 51.

Furthermore, this exemplified embodiment differs from the previous one in that its elastic bladders 24 and its filter cloths 28a and 28b are provided with surface increasing folds 52a and 52b as well as 53a and 53b, respectively. FIG. 5 shows that when bladders 24 are bulged in, folds 53a and 53b of filter cloths 28a and 28b are smoothed out whereby they were enabled to follow deformations of the bladder walls without impairing the connection therebetween.

Figures 7, 8:
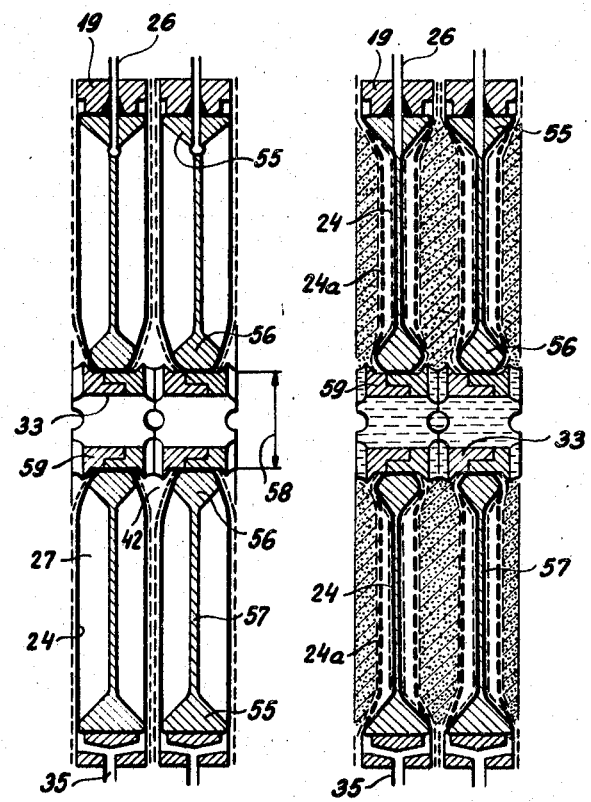
FIGS. 7 and 8 illustrate a further exemplified embodiment in sectional views similar to FIGS. 1 to 3.

The exemplified embodiment shown in FIGS. 7 and 8 differs from that according to FIGS. 1 to 3 in that, on the one hand, filter frames 19 join one another directly and without alternate insertion of filter plates. On the other hand, the bracers of bladders 24 are supported in their middle portion and consist each of an outer frame 55, an inner frame 56 and of a web 57 connecting said outer frame with said inner frame. The inner frames 56 delimit each an opening 58 which encompass two part hollow cores 59 as illustrated in FIGS. 4 and 5 on an enlarged scale.

In closed position of the filter press, cores 59 are axially abutted against one another so that their cavities form a continuous passage through which a suspension or slurry may be introduced into the cake chambers and which corresponds to the slurry or suspension introducing main channel 33 of the exemplified embodiment shown in FIGS. 1 to 3. The operational position associated with compression is likewise illustrated (FIG. 8). It is distinguished from the previous operational position by that the walls of bladders 24 are illustrated by thick dashed lines 24a. The significance of the central support of bracers 55, 56, 57 has hereinbefore been explained in the preamble of the present specification.

FIG. 9 illustrates an exemplified embodiment with which bladdered filter frames 19 have complementary filter surfaces inserted therebetween so that the total filtering surface substantially increases. Essentially, said complementary filter surfaces are foraminated plates or wire screens 61 both sides of which have filter cloths 62a and 62b arranged on them. The filtrate withdraws through a collecting channel 63. Obviously, filter surface 61 is suitable for filtering work only and does not participate in taking up occasional pressure differences which are taken up by the inserts 57 of the bladders 24. Thus, in this respect such foraminated plates or wire screens are basically different from more or less rigid filter plates. On the other hand, the specific filter surface is again redoubled with respect to that of filter presses with no such complementary filter surfaces.

Figure 10:
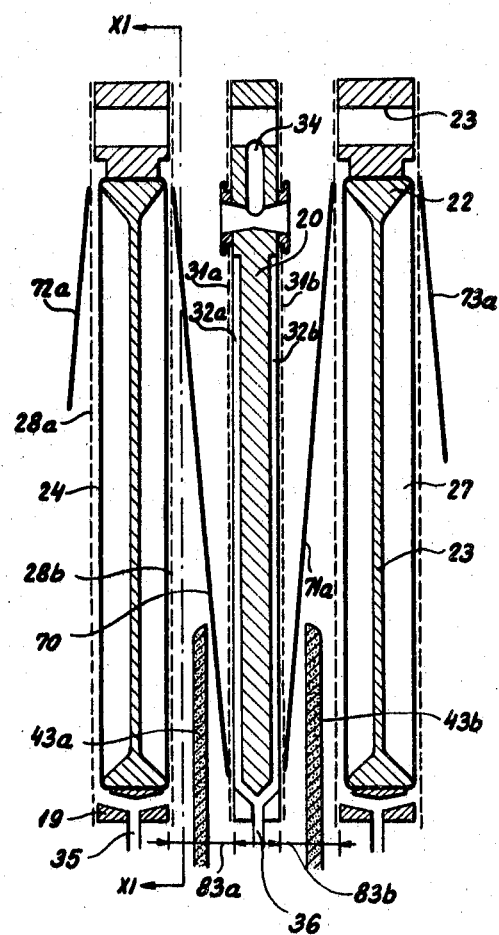

FIGS. 10 and 11 represent again a filter press with filter plates 20 covered with filter cloths 31a and 31b between pairs of filter frames such as 19. Moreover, in the instant case pairs of elastic fibres such as 70 and 71 are tightened between tops and bottoms of adjacent filter frames and filter plates, respectively. When the filter press is closed, fibres 70 and 71 occupy vertical positions, that is lie against said filter means. This is readily seen if the filter members shown in FIG. 10 are imagined in their closed positions as shown e.g. in FIG. 3. Similar pairs of fibres 72 and 73 are provided in a similar manner between next pairs of filter members, etc.

On the other hand, in spaced apart positions of the filter members, pairs of fibers 70, 71, 72, 73 occupy oblique positions or enclose an acute angle with the planes of the filter means such as 28a and 28b. This means that filter cakes e.g. 43a and 43b which may adhere to filter cloths 31a and 31b will be separated therefrom by pairs of fibres 70 and 71, respectively, and drop down through gaps 83a and 83b between adjacent filter members. If e.g. filter cake 43a should have adhered to filter cloth 28b of bladder 24, their separation could be obtained by putting the elastic chamber 27 under pressure. Thus, the represented exemplified embodiment is particularly suitable to work with suspensions or slurries the solid phases of which are liable to adhere in the form of cakes to filter means and thereby to render discharging thereof more difficult.

For reasons of drawing technique, only top portions of both external fibres 72 and 73 are shown in FIG. 10. Thereby, however, illustration of an exemplified embodiment referred to in the preamble of the present specification is obtained with which a pair of elastic tongues 72 and 73 is fixed to the top portion of each frame. Such tongues work in a similar manner as was the case with fibres 70 and 71: when the filter members such as filter plate 19 and its not represented left-hand neighbour are spaced apart, tongue 72 is permitted to resume its projecting position whereby a cake adhering to filter cloth 28a will be thrown off.

What is claimed is:

1. In a mechanized heavy-duty filter press comprising movable filter members defining cake chambers between them in axially abutted positions thereof, inflatable bladders connectable to an external source of pressure agent and disposed each in one of said filter members, said inflatable bladders having walls normally spaced apart by solid bracers therein, means for admitting a slurry into said cake chambers, and means for admitting and withdrawing said pressure agent into and from said inflatable bladders; the improvement comprising first filter cloths on the outer surfaces of said inflatable bladders, means defining filtrate abducting passages between said filter cloths and said walls of said bladders, second filter cloths on the opposite sides of said cake chambers from said first filter cloths, and means for abducting filtrate from the sides of said second filter cloths which are opposite said cake chambers.

2. A filter press as claimed in claim 1, wherein said solid bracers in said inflatable bladders consist each of an outer frame, an inner frame and a web connecting said frames with one another, said inner frames delimiting each an opening, hollow cores in said openings, said hollow cores forming a passage for introducing a slurry into said cake chambers in axially abutted positions of said filter members.

3. A filter press as claimed in claim 1, wherein cake removing elastic tongues are fixed to said filter members, said cake removing tongues lying against said filter means in closed position of said filter press, and enclosing an acute angle with the planes of said filter means in open positions of said filter press.

4. A filter press as claimed in claim 1, of the type having alternately arranged filter plates and filter frames with bladders in said filter frames, wherein cake removing elastic fibres are provided between adjacent filter frames and filter plates, said fibres being fixed to said filter frames at their top positions and to said filter plates at their bottom portions.

5. A filter press as claimed in claim 1, each said solid bracer comprising a web confined by at least one frame, said inflatable bladders and said filter cloths having folds along said frame.

6. A filter press as claimed in claim 1, said filter members with bladders therein being directly abutted against one another in the closed position of the filter press, said second filter cloths being disposed on the outer surfaces of certain of said inflatable bladders.

7. A filter press as claimed in claim 1 having alternately arranged filter plates and filter frames with bladders in said filter frames, said second filter cloths being disposed on opposite outer surfaces of said filter plates.

8. A filter press as claimed in claim 1 having alternately arranged flat foraminous members and filter frames with bladders in said filter frames, said second filter cloths being disposed on the opposite sides of said flat foraminous members.

9. A filtering method effected by a mechanized heavy duty filter press having movable filter members, cake chambers enclosed by said filter members in axially abutted positions thereof, inflatable bladders connectable to an external source of fluid pressure agent and disposed each in one of said filter members, comprising the steps of introducing a slurry into said cake chambers, supplying said pressure agent at elevated temperature into said inflatable bladders so as to simultaneously compress and desiccate filter cakes growing in said cake chambers, spacing apart members of said filter press, and removing said filter cakes from said cake chambers.

References Cited

UNITED STATES PATENTS

| 3,112,264 | 11/1963 | Bub | 210—487 X |
| 3,270,887 | 9/1966 | Juhasz et al. | 210—225 |

FOREIGN PATENTS 596,888  8/1959  Italy.

REUBEN FRIEDMAN, *Primary Examiner.*

SAMIH N. ZAHARNA, *Examiner.*

J. ADEE, *Assistant Examiner.*